Patented Apr. 22, 1924.

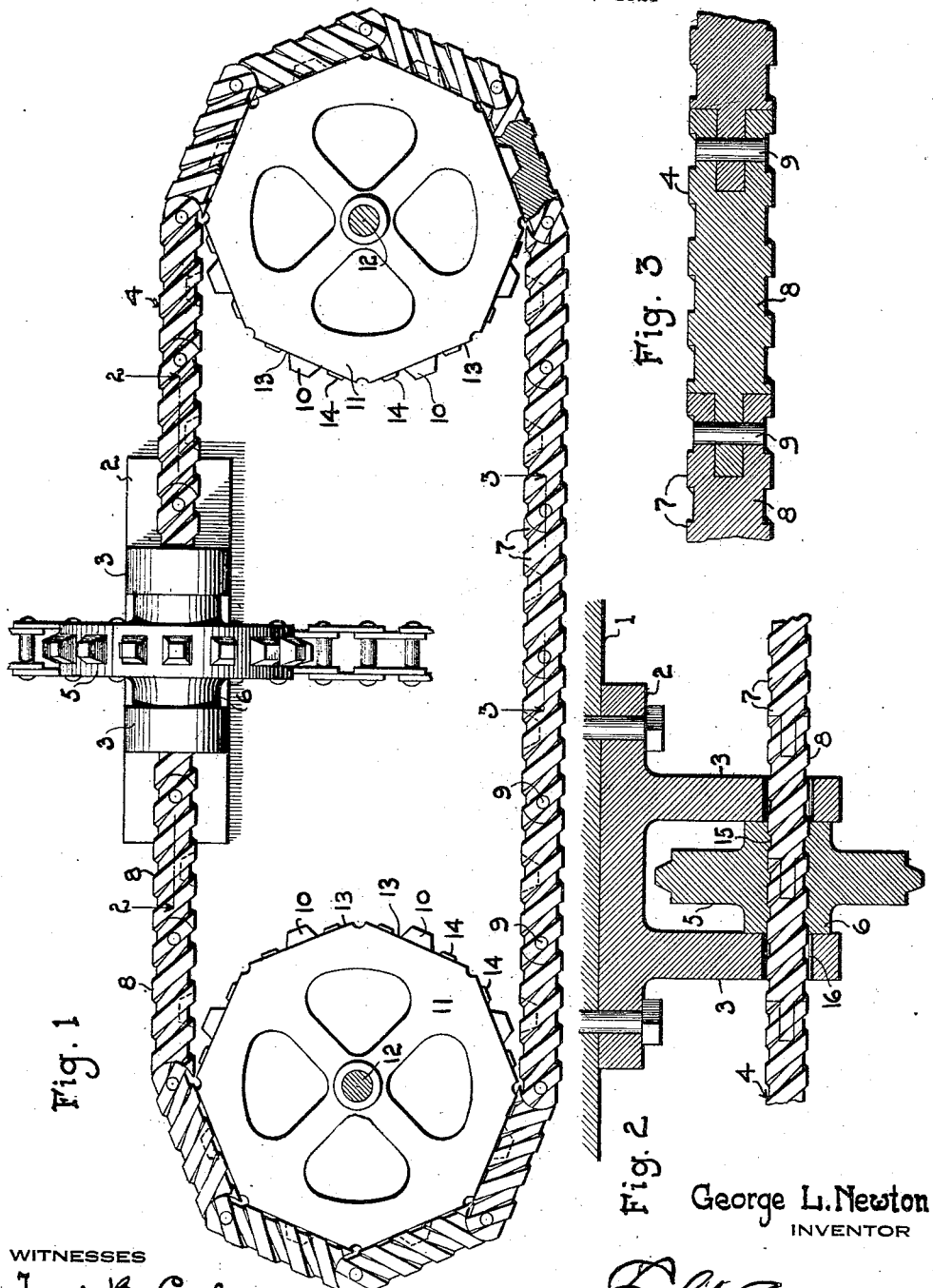

1,491,490

UNITED STATES PATENT OFFICE.

GEORGE LESTER NEWTON, OF MACHEN, GEORGIA.

ENDLESS-CHAIN GEARING.

Application filed September 14, 1921, Serial No. 500,600. Renewed September 30, 1922. Serial No. 591,667.

*To all whom it may concern:*

Be it known that I, GEORGE L. NEWTON, a citizen of the United States, residing at Machen, in the county of Jasper and State of Georgia, have invented a new and useful Endless-Chain Gearing, of which the following is a specification.

This invention relates to a means for transmitting power, and is more particularly directed to a device for converting a rotary into a linear motion by means of a new and improved worm or screw-threaded means.

The object of the invention is to transmit power directly from a gear, sprocket, or drum having an internally threaded hub, to an endless worm or screw-threaded chain for driving tractors or slow moving vehicles whereby power is gained and the expense of operating the same is greatly reduced.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Fig. 1 is a side elevation of the power transmitting device.

Fig. 2 is a transverse section taken along the line 2—2 of Fig. 1.

Fig. 3 is an enlarged view in section taken along the line 3—3 of Fig. 1.

Referring to the drawing, 1 designates a portion of the framework of a tractor or other slow moving vehicle to which is secured a bracket or support 2 having the outwardly projecting arms 3 between which is rotatably mounted, on an endless chain 4, a sprocket, gear, or drum 5.

The hub 6 of the sprocket is internally threaded, as shown in Fig. 2, at 15, and is adapted to engage the worm or screw threads 7 of the endless chain 4 which comprises a series of links 8 pivotally connected to each other, at 9.

The inner side portion of the links comprising the endless chain are provided with indentations of a configuration to fit teeth 10 mounted upon the polygonally-faced sprockets 11 spaced from each other and journaled on the frame 1, at 12. The faces 13 of the polygonally-faced sprockets 11 are provided with diagonally disposed ribs 14 adapted to mesh with the spiral depressions located between the threads 7 of the worm or screw-threaded endless chain 4.

The spaced arms 3 of the bracket 2 are perforated near their outer free ends as shown at 16 through which the endless chain 4 is adapted to pass and by which the chain 4 is supported, and in turn supports the sprocket 5, since the screw-threaded chain passes through the internally threaded hub 6 of the sprocket 5.

Since it has long been known that screw power is very reliable and strong, I have attempted to use the same for the driving of vehicles wherein considerable power is necessary to maintain the vehicle in motion. It will be seen, therefore, that in applying the present device to tractors, the sprocket, gear, or drum 5 will be driven in any approved manner by an engine located on the tractor, and which ordinarily forms a fixed part therewith, and as the sprocket 5 is rotated, the internal threads located in the hub 6 of the sprocket being in engagement with the worm or screw threads 7 on the endless chain, drives the chain along with a great deal of power and thereby causes the sprockets 11 to be rotated, the teeth 10 of the sprockets 11 engaging the indentations formed in the links and the diagonally disposed ribs 14 engaging the spiral depressions between the threads 15 of the links.

The sprockets 11 may be connected to the wheels of the tractor or form a fixed part of the hub of the wheels. Under some circumstances, it may be advisable to apply power to the chain through the sprockets 11, and have the sprocket or movable element 5 as the driven member.

What is claimed is:—

1. In a mechanism for transmitting power, a chain made up of a series of links, means for supporting the same so that a portion thereof is straight, each of said links being provided with a worm thread extending helically around the same from end to end thereof, said links being so connected as to form a continuous and uninterrupted thread throughout the straight portion of the chain, and a drum or sprocket having an internally threaded hub in mesh with said thread and operable, when rotated, to drive the chain.

2. In a mechanism for transmitting power, an endless chain comprising a series of links each provided with a male worm thread adapted to mesh with the internally threaded hub of a drum or sprocket, said drum being adapted to be rotated to drive the chain, and spaced perforations in the links adapted to be engaged by the teeth of rotatably mounted spaced sprocket wheels.

3. In a mechanism for transmitting power, an endless chain comprising a series of links each provided with a worm thread adapted to mesh with the internally threaded hub of a drum or sprocket, said drum being adapted to be rotated to drive the chain, and spaced perforations in the links adapted to be engaged by the teeth of rotatably mounted spaced sprocket wheels, said sprocket wheels being provided with diagonally disposed projections on the peripheries adapted to engage the interstices between the threads of the worm formed on the links.

4. In a mechanism for transmitting power, an endless chain comprising a series of links, each provided with a worm thread extending from end to end thereof about the longitudinal center of the link as an axis, said links being so connected that they form a continuous and uninterrupted thread throughout the straight portion of the chain, a drum or sprocket having an internally threaded hub in mesh with one of said straight portions, and operable, when rotated, to drive the chain, and means to hold the drum in its relative position on the chain.

5. In a mechanism for transmitting power, an endless chain comprising a series of links, each provided with a male worm thread extending throughout its length, said links being so connected that the thread is continuous and uninterrupted throughout the straight portion of the chain, and a sprocket wheel having an internally threaded hub in mesh with said straight portion and operable, when rotated, to drive the chain, said drum being fully supported on the endless chain.

6. In a mechanism for transmitting power, an endless chain comprising a series of links each provided with a male worm thread adapted to mesh with the internally threaded hub of a drum or sprocket, said drum being adapted to be rotated to drive the chain, and spaced perforations in the links and located transversely of the worm threads on the endless chain and adapted to be engaged by the teeth of rotatably mounted spaced sprocket wheels.

7. In combination with a movable element having an internally threaded passage, a movable endless chain element comprising a series of pivotally connected links, each having a male worm thread extending from end to end thereof and adapted to mesh with the thread of said passage, the male threads being so arranged on the respective links as to form a continuous and uninterrupted thread throughout the straight portion of the endless chain element, one of said elements being the driven element, and the other the driving element.

8. In combination with a movable element having an internally threaded passage, a support, and a movable endless chain having a worm thread thereon adapted to engage with the threaded passage of said movable element, said chain serving to connect the latter to the support and support the same.

9. In combination with a support having openings, a movable element mounted in said support and having an internally threaded passage, a movable endless chain having a worm thread thereon to mesh with said internally threaded passage of said element, a pair of sprocket wheels having their teeth engaging said chain, and means, other than said teeth, to engage the threads of the worm formed on said chain.

In testimony that I claim the foregoing as my own, I have hereto affixed my signature.

GEORGE LESTER NEWTON.